(No Model.)

L. LEMOS.
SPICE AND DREDGING BOX.

No. 348,752. Patented Sept. 7, 1886.

Witnesses:
Wm Mayer
Joseph E. Ford

Inventor:
Leon Lemos
By C. W. M. Smith
Atty.

UNITED STATES PATENT OFFICE.

LEON LEMOS, OF SAN FRANCISCO, CALIFORNIA.

SPICE AND DREDGING BOX.

SPECIFICATION forming part of Letters Patent No. 348,752, dated September 7, 1886.

Application filed March 20, 1886. Serial No. 196,028. (No model.)

*To all whom it may concern:*

Be it known that I, LEON LEMOS, a citizen of the United States, residing at San Francisco, in the county of San Francisco and State of California, have invented a new and useful Improvement in Spice and Dredging Boxes, of which the following is a specification.

My improvement relates to that class of spice-boxes used upon the table mainly employed for dredging ground pepper upon food, although it may be used for dredging flour, salt, &c.; and it consists in hinging a supplemental cover to the ordinary cover of the box provided with projecting pins, which enter the perforations or holes in the cover to keep these holes free, and also to prevent the aroma from escaping from the condiment or spice contained in the box, all of which will be hereinafter fully described.

Figure 1:
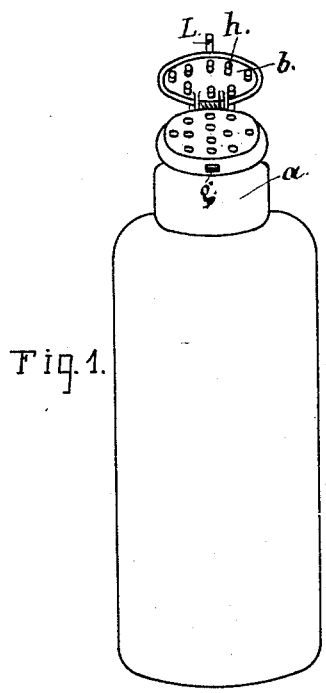
Figure 2:
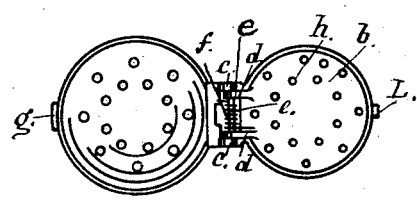

Referring to the accompanying drawings, forming a part of this specification, Figure 1 is a perspective view of my spice or pepper box. Fig. 2 is a plan of cap with cover thrown back.

To the screw-cap of the ordinary pepper-box $a$, provided with holes or perforations, I connect by means of a hinge the supplemental cover $b$. The hinge-connection is made by forming a lug upon one side of the screw-cap, provided with two projecting knuckles, $c$, within which are fitted the two corresponding knuckles $d$ of the supplemental cover, and through these knuckles pass a pin or pintle, $e$, which forms the hinge, space being left between the four knuckles for a small spring, $f$, which is coiled around the pintle or pin, having its outer ends resting upon the respective plates composing the screw-cap and supplemental cover, so that when the cover is released from the catch $g$ the resilience of the spring will cause it to fly backward away from the screw-cap and leave the holes through which the condiment is dredged exposed. The interior of the supplemental cover $b$ is pierced with downwardly-projecting pins $h$, in number to correspond with the number of the holes in the screw-cap, and when the cover is shut down over the screw-cap these pins enter the holes and clear them of any particles of substance that may have adhered thereto, and should the pins be made to fit the holes and the cover be kept down by the spring-arm L engaging with the catch $g$, the aroma of the spices or pepper contained in the box will be prevented from escaping.

I am aware that salt and dredge bottles have hitherto been provided with supplemental covers to exclude the air and prevent caking, and also with interior devices consisting of prongs or rods adapted to enter the perforations of the cover. This, therefore, I do not broadly claim as new.

Having thus described my invention, what I claim, and desire to secure by Letters Patent, is—

1. In a condiment or dredging box having a perforated cap or cover, the hinged supplemental cover provided with projecting pins and adapted to shut over the perforated cap and cause the pins to enter the holes thereof, in the manner and for the purpose specified.

2. In a condiment or dredging box having a perforated cap or cover and a hinged supplemental cover provided with pins and adapted to shut over the perforated cap and cause the pins to enter the holes therein, the means for operating the said supplemental cover, consisting of the resilient spring, as described.

3. In a condiment or dredging box having a perforated cap and supplemental cover, with projecting pins adapted to shut over the perforated cap and cause the pins to enter the holes therein, the spring-arm and catch for holding the supplemental cover in position, as described.

In testimony that I claim the foregoing I have hereunto set my hand and seal.

LEON LEMOS. [L. S.]

Witnesses:
C. W. M. SMITH,
CHAS. E. KELLY.